UNITED STATES PATENT OFFICE 2,312,047

FLUORINE REMOVAL FROM PHOSPHATE LIQUORS

Sihon C. Ogburn, Jr., Westfield, N. J., assignor to General Chemical Company, New York, N. Y., a corporation of New York No Drawing. Application March 18, 1940, Serial No. 324,051

7 Claims. (Cl. 23—109)

This invention relates to treatment of phosphate liquors to remove fluorine therefrom, and more particularly to the removal of small amounts of fluorine impurities from phosphate liquors, especially monocalcium phosphate liquors, to produce food grade phosphates. The term "liquors" is used herein to include solutions and slurries of phosphates.

Government regulation in connection with, and purchasers' specifications for, food grade phosphate products rigidly limit the amount of fluorine permitted therein; at the present time monocalcium phosphate containing more than .001% fluorine is considered unsatisfactory for food purposes. While the production of monocalcium phosphate containing less than .001% fluorine is feasible by reacting high grade hydrated lime with food grade phosphoric acid produced from blast or electric furnace operation as is well known in the art, the production of such food grade monocalcium phosphate from crude phosphoric acid made by reacting phosphate rock with sulfuric acid has presented substantial difficulties. As contrasted with food grade phosphoric acid, which usually contains about .0003% fluorine, crude phosphoric acid made from phosphate rock, even after known treatments, such as blowing with air or steam to reduce the fluorine content, contains about .003% fluorine. In the processing of such phosphoric acid by heretofore known methods to produce monocalcium phosphate or other phosphate salts, phosphate products produced invariably contained from .003% to .03% fluorine.

It is an object of this invention to provide a process for the treatment of phosphate liquors containing fluorine to produce phosphate products of food grade value meeting the most rigid specifications therefor, which process is especially adapted for the treatment of phosphate liquors produced from crude phosphoric acid as the starting material, and can readily be carried out in connection with the usual procedure of processing such crude acid to produce phosphate products without involving substantial changes in such procedure or the use of equipment in addition to that normally employed in such procedure. Other objects and advantages of this invention will appear from the following detailed description thereof.

In accordance with this invention, phosphate liquors containing free acidity in amount not exceeding 3%, expressed as $P_2O_5$, are treated with a small amount of bone black, the amount used being proportional to the amount of fluorine present in the phosphate liquors. As the amount of fluorine varies with different phosphate liquors, the amount of bone black used in the treatment of such liquors will necessarily vary. I have found that generally from about 0.1 to about 1%, preferably from about .15% to about .3%, of bone black, based on the total weight of phosphates present in the liquor treated will give satisfactory removal of fluorine.

While the invention may be used for the treatment of phosphate liquors having a relatively high fluorine content, say in excess of about .03%, from an economic standpoint it will be found desirable to treat liquors having such high fluorine content by blowing with air, steam or other known process, to reduce the fluorine content to a value not exceeding about .03% and then treat the liquors with bone black in accordance with this invention to remove fluorine to a point such that a food grade phosphate product can be obtained. In the treatment of liquors having a free acidity exceeding about 3% expressed as free $P_2O_5$, the free acid should be neutralized or otherwise reduced before the bone black treatment to remove fluorine impurities.

Bone black, as is well known, is produced by the destructive distillation of bones in the absence of air, and is constituted chiefly of $Ca_3(PO_4)_2$ and contains a minor amount (of the order of 11%) of oxidizable material, which is mostly carbon in activated form. The bone black used may be powdered or granular; granular material of a state of subdivision such that it passes through a 50 mesh screen but is retained on an 80 mesh screen has been found satisfactory. The use of finer material, however, has the advantage that it will act more quickly in effecting fluorine removal.

While the explanation for the mechanism of the reaction between the bone black and fluorine present in phosphate liquors is not definitely known, it is believed that the reaction is probably both chemical and physico-chemical, e. g. adsorption. In the case of the treatment of calcium phosphate liquors, it is believed complex calcium-fluoro-phosphates are formed which are extremely insoluble in solutions having a pH value equal to that of the solutions treated in accordance with this invention, i. e. solutions having, at room temperature, a pH within the range of about 1.5 to 3.5.

The use of bone black in accordance with this invention, it has been found, results in a phosphate product of improved color; the bone black effects or aids in effecting removal of colorforming bodies. Also, it functions as a filtering aid to effect a more efficient separation of the phosphate liquor from the impurities precipitated therefrom during the processing thereof.

In the processing of monocalcium phosphate liquors the bone black treatment is preferably carried out during the usual lime reaction with the crude phosphoric acid after the addition of lime to the point where the liquor has a pH within the range of about 2.7 to 2.9. Free $P_2O_5$ and pH values are influenced by the temperature at which the lime reaction is carried out. With increased temperature, the free $P_2O_5$ increases with concurrent lowering of pH value and precipitation of excessive quantity of dicalcium phosphate as the monocalcium phosphate end point is approached. Liming is accompanied by precipitation of iron and aluminum phosphates together with some dicalcium phosphate and calcium-fluorine compounds, i. e. "white mud"; the presence of this "white mud," I have found, aids in fluorine removal by the bone black treatment in accordance with this invention. Use of lime in amount in excess of the stoichiometric amount necessary to combine with all of the phosphoric acid present to produce monocalcium phosphate will not satisfactorily remove the fluorine and will result in formation of large amounts of dicalcium phosphate. Increase of temperature, per se, does not interfere with fluorine removal from phosphate liquors by bone black.

Preferably, the production of monocalcium phosphate is carried out by treating the crude phosphoric acid, previously treated to remove sulfate by well known methods, with lime in two steps; in the first step, about 98% of the total lime used is added, and bone black, in powdered or granular form, is mixed with the batch, which is then thoroughly agitated and filtered. The amount of bone black thus added may be from about 0.05 to about 0.1%, based on the weight of the phosphate present. The remainder of the lime is added to the filtrate and from about 0.2 to about 0.3% of bone black is then added thereto and the mixture agitated. Thereafter the mixture may be gassed with hydrogen sulfide to effect the removal of lead and arsenic impurities, as sulfides, and the mixture filtered. Monocalcium phosphate may be crystallized from the filtrate.

The following example is illustrative of a preferred embodiment of the process of this invention:

4045 pounds of crude phosphoric acid containing 43% phosphoric acid expressed as $P_2O_5$ and .0035% fluorine, previously treated to remove sulfate, were treated with an aqueous slurry containing 783 pounds of hydrated lime (which constitutes 98% of 799 pounds of lime, the total lime used in the liming of the phosphoric acid), producing a monocalcium phosphate batch constituted of 20,000 pounds of slurry containing .0015% fluorine. To this slurry were added 17 pounds of granular bone black, the batch thoroughly agitated for 30 minutes and then filtered. The resulting monocalcium phosphate filtrate contained .00065% fluorine. An aqueous slurry containing 16 pounds of hydrated lime (constituting the remaining 2% of the lime used) were added to the filtrate of 18,667 pounds and then 50 pounds of bone black and the resultant mixture agitated for 1 hour, then gassed with hydrogen sulfide and filtered, producing a filtrate containing .00015% fluorine. The monocalcium phosphate crystallized from the filtrate contained .0004% fluorine.

While the above example refers to the production of monocalcium phosphate, it will be understood that the invention is not limited to the treatment of monocalcium phosphate liquors containing fluorine, but includes the processing of other phosphate liquors such as sodium phosphate liquors, dicalcium phosphate liquors, and others containing fluorine.

The monocalcium product produced in accordance with this invention has been found to contain an amount of fluorine substantially below the limit of .001%; samples analyzed contained from .0004% to .0006% fluorine. Further, the product produced in accordance with this invention was found to be of an improved color as compared with products made under like conditions but not involving the bone black treatment of this invention. It was found that the use of bone black not only reduced the fluorine content materially, as above pointed out, but permitted the elimination of treatment of monocalcium phosphate liquors with Norite (activated carbon), which treatment has been resorted to in order to improve the color of the liquor. Moreover, the bone black aided in effecting the filtration of the monocalcium phosphate liquors from the precipitated materials and reduced the time required for effecting filtration.

In the specification and claims the term "fluorine" is used to refer not only to simple fluorides, but also to complex compounds containing fluorine such as fluosilicates.

It is to be understood that this invention is not restricted to the present disclosure otherwise than as defined by the appended claims.

What is claimed is:

1. A process for removing fluorine from a phosphate liquor having a pH of from about 1.5 to 3.5 and containing not more than about .03% fluorine, which comprises adding bone black to the liquor, agitating the resulting mixture for a time sufficient for the bone black to combine with the fluorine so as to reduce the fluorine content to a value such that a phosphate product crystallized therefrom has a fluorine content not exceeding about .001%, and then separating the purified liquor from the bone black.

2. A process of removing fluorine from monocalcium phosphate liquor having a pH of from about 1.5 to 3.5 and containing not more than about .03% fluorine, which comprises adding bone black to the liquor, agitating the resulting mixture for a sufficient time for the bone black to combine with the fluorine so as to reduce the fluorine content to a value such that the monocalcium phosphate crystallized therefrom has a fluorine content not exceeding about .001% and then separating the purified liquor from the bone black.

3. In a process for purifying phosphate liquors containing fluorine to produce liquors from which food-grade products may be recovered, the steps which comprise contacting a fluorine-containing phosphate liquor having a pH of from about 1.5 to 3.5 and containing not more than about .03% fluorine with bone black for a time sufficient to cause the bone black to combine with the fluorine so as to produce a phosphate liquor having a fluorine content such that food-grade phosphate products may be recovered therefrom, and separating the purified liquor from the bone black.

4. The method of purifying calcium phosphate liquor containing not more than about .03% fluorine and having a pH of from about 1.5 to about 3.5, produced by the treatment of crude phosphoric acid with lime, which comprises adding about .1% to 1% bone black to the liquor after the addition of lime to the crude acid in amount sufficient to produce a liquor having a pH of from about 1.5 to about 3.5, agitating the mixture for a time sufficient for the bone black to combine with the fluorine so as to reduce the fluorine content to a value such that calcium phosphate crystallized therefrom has a fluorine content not exceeding about .001%, and then separating the calcium phosphate liquor from the bone black and precipitated impurities.

5. The process of preparing monocalcium phosphate which comprises reacting lime with crude phosphoric acid to form a monocalcium phosphate solution having a pH of from about 1.5 to about 3.5 and fluorine not exceeding about .03%, adding from about .15 to about .3% finely divided bone black to this solution, agitating the mixture for a time sufficient for the bone black to combine with the fluorine so as to reduce the fluorine content to a value such that monocalcium phosphate crystallized therefrom has a fluorine content not exceeding about .001%, and then separating the purified solution from the bone black and impurities removed from the solution.

6. The process of preparing monocalcium phosphate from crude phosphoric acid which comprises (1) treating crude phosphoric acid with lime to form a monocalcium phosphate solution containing not more than about .03% fluorine, (2) adding bone black to the lime-treated crude phosphoric acid and agitating the mixture for a time sufficient for the bone black to combine with the fluorine, (3) separating the monocalcium phosphate solution from the bone black and "white mud" produced in step 1, (4) treating the monocalcium phosphate solution thus separated with additional lime, (5) adding a further amount of bone black to the lime-treated solution of step 4 and agitating the mixture for a time sufficient for the bone black to combine with the fluorine so as to reduce the fluorine content to a value such that monocalcium phosphate crystallized therefrom has a fluorine content not exceeding about .001%, and (6) separating the purified monocalcium phosphate solution from the bone black.

7. The process of preparing monocalcium phosphate from crude phosphoric acid which comprises (1) treating the crude phosphoric acid with lime to produce a monocalcium phosphate solution having a pH of from about 2.7 to about 2.9 and containing not more than about .03% fluorine, (2) adding from about .05% to about .1% bone black to the lime-treated crude phosphoric acid and agitating the mixture for a time sufficient for the bone black to combine with the fluorine, (3) separating the monocalcium phosphate solution from the bone black and "white mud" produced in step 1, (4) treating the monocalcium phosphate solution from step 3 with additional lime, (5) adding from about .2% to about .3% bone black to the lime-treated solution of step 4 and agitating the mixture for a time sufficient for the bone black to combine with the fluorine so as to reduce the fluorine content to a value such that monocalcium phosphate crystallized therefrom has a fluorine content not exceeding about .001%, and (6) separating the purified monocalcium phosphate solution from the bone black.

SIHON C. OGBURN, Jr.